US009736376B1

(12) United States Patent
Holway et al.

(10) Patent No.: US 9,736,376 B1
(45) Date of Patent: Aug. 15, 2017

(54) TILT HEAD, CAMERA STAGE, MULTI-POST MONITOR MOUNT AND CAMERA STABILIZER ENCOMPASSING THE SAME

(71) Applicant: The Tiffen Company, LLC, Hauppauge, NY (US)

(72) Inventors: Jerry Holway, Exton, PA (US); Jacob Hawkins, Sierra Madre, CA (US); H. Robert Orf, Simi Valley, CA (US); Dwayne McClintock, Newbury Park, CA (US)

(73) Assignee: The Tiffen Company, LLC, Hauppauge, NY (US)

( * ) Notice: Subject to any disclaimer, the term of this patent is extended or adjusted under 35 U.S.C. 154(b) by 112 days.

(21) Appl. No.: 14/677,607

(22) Filed: Apr. 2, 2015

Related U.S. Application Data

(60) Provisional application No. 61/974,851, filed on Apr. 3, 2014.

(51) Int. Cl.
  *H04N 5/00* (2011.01)
  *H04N 5/232* (2006.01)
  *H04N 5/225* (2006.01)

(52) U.S. Cl.
  CPC ......... *H04N 5/2328* (2013.01); *H04N 5/2251* (2013.01)

(58) Field of Classification Search
  CPC ............................ H04N 5/2328; H04N 5/2251
  USPC ...................................................... 248/187.1
  See application file for complete search history.

(56) References Cited

U.S. PATENT DOCUMENTS

| | | | |
|---|---|---|---|
| 817,207 A | 4/1906 | Wheeler | |
| 1,730,346 A | 10/1929 | Beeson et al. | |
| 2,007,215 A | 7/1935 | Remey | |
| 2,239,201 A | 4/1941 | Pyzel | |
| 2,447,667 A | 8/1948 | Raby | |
| 2,481,717 A * | 9/1949 | Blair ..................... | F16M 11/10 |
| | | | 248/183.2 |
| 2,599,269 A | 6/1952 | Markle | |
| 2,636,822 A | 4/1953 | Anderson | |
| 2,806,416 A | 9/1957 | Jones | |
| 2,945,428 A | 7/1960 | Dearborn | |
| 2,962,251 A | 11/1960 | Karpf | |
| 2,990,764 A | 7/1961 | Wilder | |
| 3,103,257 A | 9/1963 | Richards | |
| 3,105,430 A | 10/1963 | Fernelius | |
| 3,273,484 A | 9/1966 | Lapsley | |
| 3,332,593 A | 7/1967 | Fauser | |

(Continued)

FOREIGN PATENT DOCUMENTS

| | | |
|---|---|---|
| DE | 2248379 | 4/1974 |
| DE | 2914219 | 11/1979 |

*Primary Examiner* — Anita M King
(74) *Attorney, Agent, or Firm* — Barnes & Thornburg LLP; Joan T. Kluger

(57) ABSTRACT

The invention includes a payload stage with tilt head, a monitor mount and a payload plate clamping mechanism, individually, and incorporated into a camera stabilizer. The tilt head provides a curved and a straight slot each having a pivot pin disposed therein. The pivot pins are at a fixed distance from one another and thus the stage tilts as the pivot progresses with respect to the straight slot. The monitor mount provides inserts to accommodate central posts of different sizes, each designed to be axially registered to the posts and the monitor mount.

24 Claims, 24 Drawing Sheets

(56) References Cited

U.S. PATENT DOCUMENTS

| | | | |
|---|---|---|---|
| 3,352,521 A | 11/1967 | Tyler | |
| 3,952,982 A | 4/1976 | Lewis | |
| 3,995,797 A | 12/1976 | Knight | |
| 4,017,168 A | 4/1977 | Brown | |
| 4,030,114 A | 6/1977 | Telfer | |
| 4,156,512 A | 5/1979 | Brown | |
| 4,158,488 A | 6/1979 | Gottschalk et al. | |
| 4,158,489 A | 6/1979 | Gottschalk et al. | |
| 4,158,490 A | 6/1979 | Gottschalk et al. | |
| 4,206,983 A | 6/1980 | Nettman et al. | |
| 4,208,028 A | 6/1980 | Brown et al. | |
| 4,233,634 A | 11/1980 | Adams | |
| 4,244,500 A | 1/1981 | Fournier | |
| 4,437,753 A | 3/1984 | Dunn | |
| 4,466,595 A * | 8/1984 | O'Connor | F16M 11/041 248/187.1 |
| 4,474,439 A | 10/1984 | Brown | |
| 4,545,660 A | 10/1985 | Rudolf | |
| 4,560,129 A | 12/1985 | Clayton | |
| RE32,213 E | 7/1986 | Brown | |
| 4,640,481 A | 2/1987 | Kohno | |
| 4,752,794 A | 6/1988 | Bohannon | |
| 4,946,272 A | 8/1990 | Brown | |
| 5,058,842 A * | 10/1991 | Zemlin | F16M 11/18 248/176.3 |
| 5,098,182 A | 3/1992 | Brown | |
| 5,230,490 A | 7/1993 | Sloop | |
| D358,832 S | 5/1995 | Lenney et al. | |
| 5,737,657 A * | 4/1998 | Paddock | F16M 11/041 248/187.1 |
| 5,752,112 A | 5/1998 | Paddock et al. | |
| 6,164,611 A * | 12/2000 | Kuhnke | F16M 11/10 248/178.1 |
| 6,293,676 B1 | 9/2001 | Holway | |
| 6,773,172 B1 * | 8/2004 | Johnson | F16M 11/041 248/187.1 |
| 7,000,883 B2 | 2/2006 | Mercadal et al. | |
| 7,077,582 B2 * | 7/2006 | Johnson | F16M 11/041 396/428 |
| 7,185,862 B1 * | 3/2007 | Yang | F16M 11/041 248/187.1 |
| 7,287,731 B2 | 10/2007 | Johnson | |
| 7,390,131 B2 * | 6/2008 | Schaller | F16M 13/04 352/243 |
| 7,625,090 B2 | 12/2009 | Brown et al. | |
| 7,641,163 B2 * | 1/2010 | O'Keene | F16M 11/10 248/284.1 |
| 7,658,556 B2 * | 2/2010 | Johnson | F16M 11/02 248/177.1 |
| 8,016,494 B2 * | 9/2011 | Holway | G03B 17/00 396/428 |
| 8,020,824 B2 * | 9/2011 | Pan | F16M 11/10 248/222.51 |
| 8,438,965 B2 * | 5/2013 | Collin | F41G 11/003 89/125 |
| 8,827,219 B2 | 9/2014 | Kessler et al. | |
| 9,297,616 B2 * | 3/2016 | Daniel | F41G 11/004 |
| 2006/0262274 A1 | 11/2006 | Brown et al. | |
| 2010/0278523 A1 | 11/2010 | Brown | |
| 2013/0000632 A1 | 1/2013 | Lundahl et al. | |

* cited by examiner

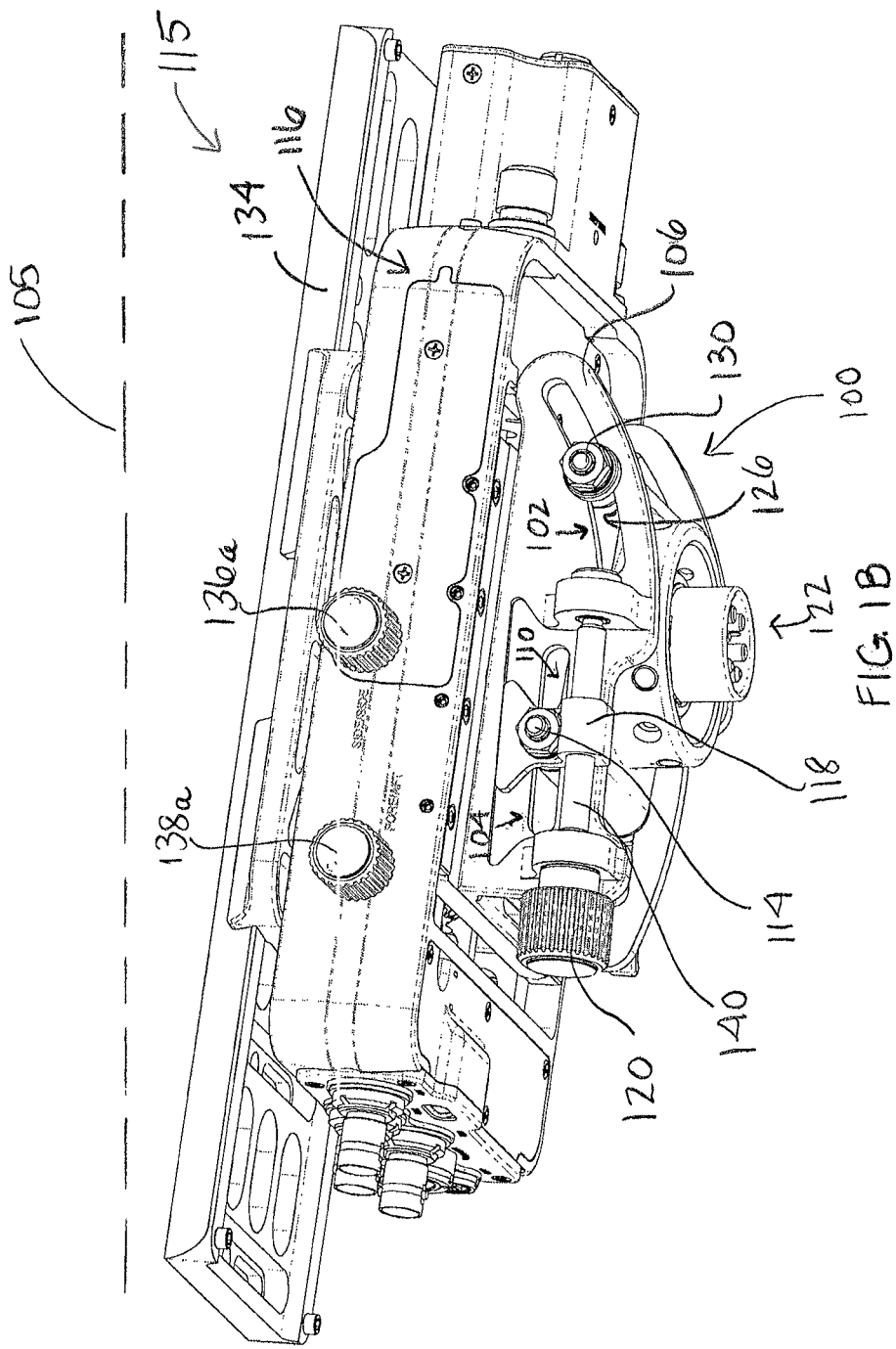

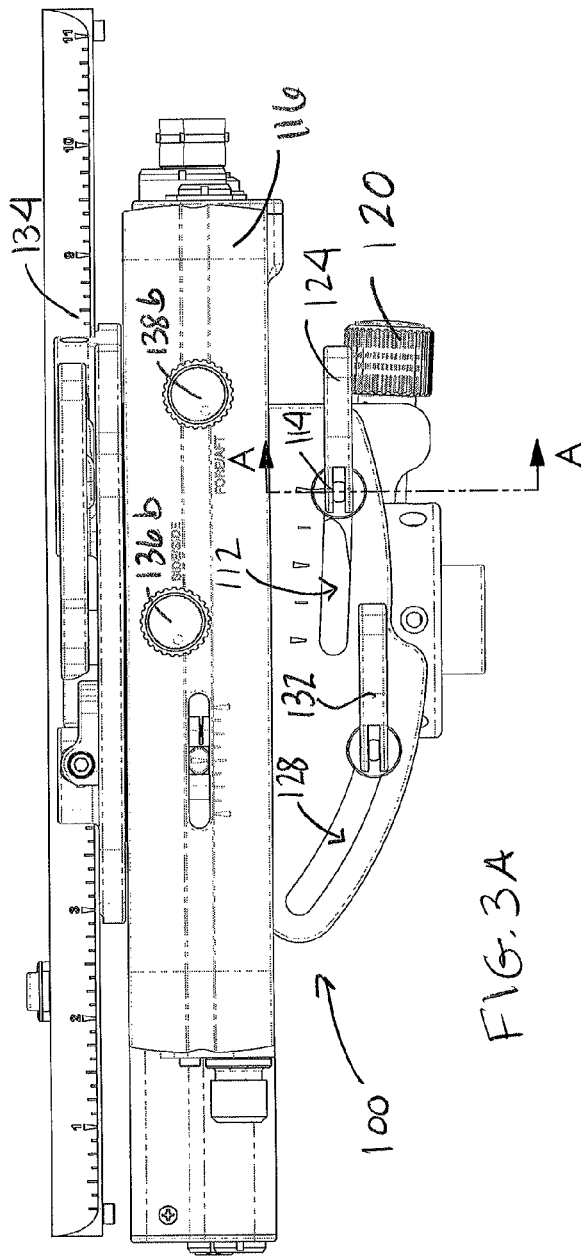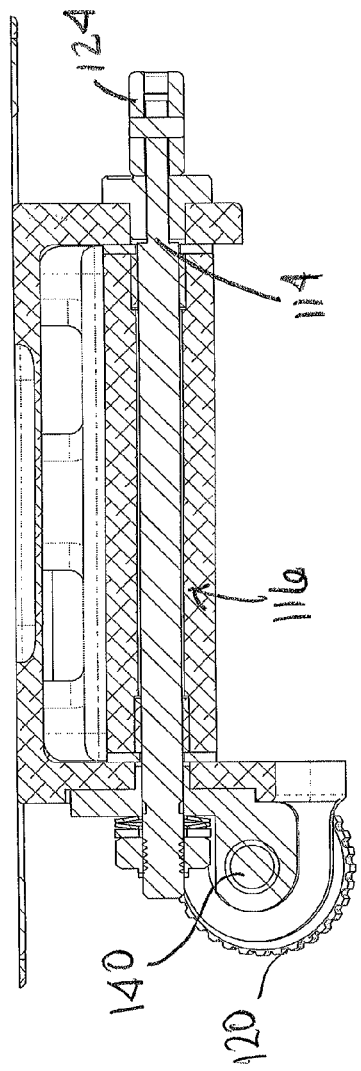
FIG. 3A
FIG. 3B

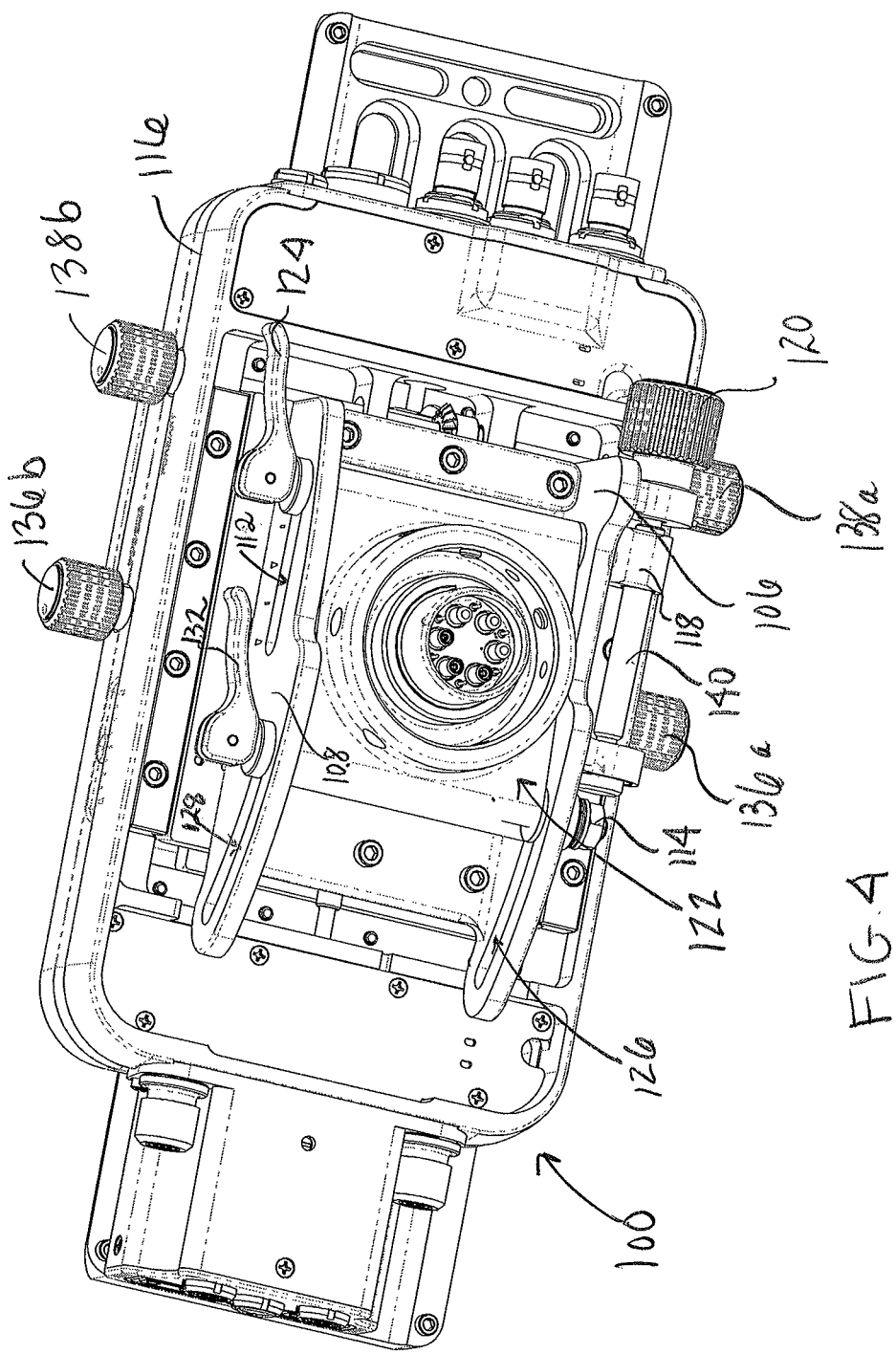

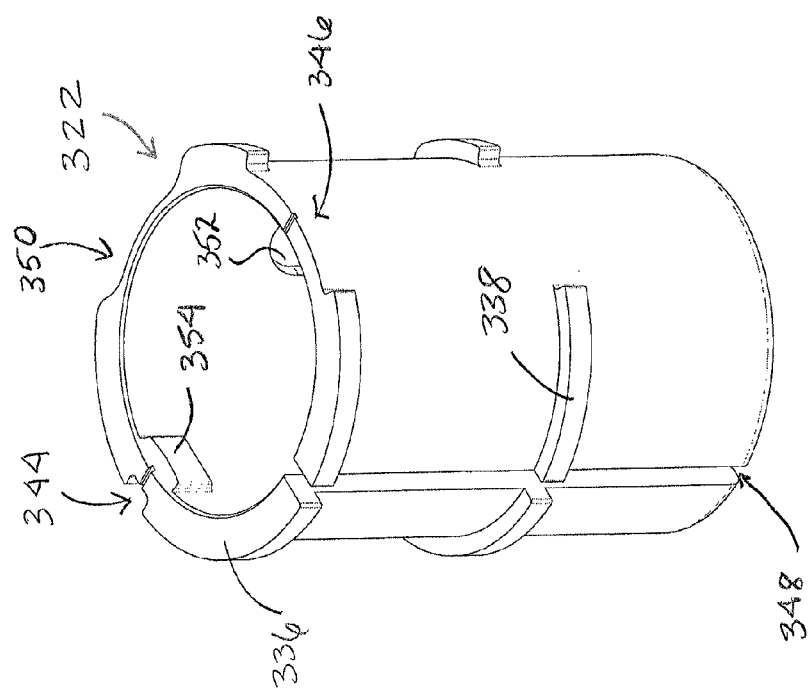

DETAIL B

TILT HEAD, CAMERA STAGE, MULTI-POST MONITOR MOUNT AND CAMERA STABILIZER ENCOMPASSING THE SAME

BACKGROUND OF THE INVENTION

Conventional camera stabilizers have a number of limitations. First, tilt heads used with inertial camera stabilization devices require several actions to tilt the head and balance the system. Tilt heads can lock up; requiring a lot of force to release, and fine adjustment of the tilt angle can be difficult. In addition, there is no method to change the angle of tilt during a shot, so that the appropriate tilt angle for each part of the shot is maintained and the central post system remains vertical.

What is needed is a method to finely adjust and hold the angle of tilt with precision without locking the head, to facilitate testing for the correct tilt angle. What is also needed is a method to change the angle of tilt during a shot.

A further limitation can be found in the connection between the camera and stabilizer apparatus. A camera must be secure on a stage of a camera stabilization apparatus and releasably in a controlled manner. Auxiliary dovetail plates and mating clamps have been used with camera support devices, especially in support devices or systems where the balance of the camera is important for proper functioning. With conventional dovetail and clamp mechanisms, as the camera is being attached to the support structure or removed from it, there is a period of time where the camera is free to fall out of the clamping structure. Various mechanical means have been employed to permit the gross positioning of the dovetail and prevent the camera from releasing from the mechanism, but they require a separate action from the operator. At times this separate action may be awkward and inconvenient, as the camera may require two hands to orient and secure the camera in position before the safety mechanism is engaged. Furthermore, dovetail clamping systems often either cannot clamp tightly enough or clamp too tightly to fully close the lever.

What is needed is a method and means of automatically initiating the safety system while the operator keeps both hands on the camera, providing an added level of security. Also needed is a method of disengaging the safety system so that it is not accidentally disengaged. What is also needed is a simple and robust method for adjusting the dovetail clamp pressure in systems employing a lever and cam to lock the dovetail in place.

Still another limitation of conventional camera stabilization systems is the connection with a monitor used for viewing, which must be securely attached to the central post of the system. Conventional monitor mounts cannot securely fix a monitor to a multiplicity of posts of different diameters, and engage each post across a large surface area (perimeter contact).

What is needed is a monitor mount that can be adequately secured to posts of different diameters without numerous additional parts, or cumbersome construction requirements.

SUMMARY OF THE INVENTION

The invention includes a payload stage with a tilt head, a monitor mount and a payload plate clamping mechanism, individually, and incorporated into a camera stabilizer. Any combination of, or all of the aforementioned, elements can be incorporated into a stabilizer.

In an illustrative embodiment of the invention, the camera stabilizer includes a stage having a payload plate disposed on and attached to a mounting platform and a tilt head attached below the mounting platform. The stage has a straight slot apparatus and a curved slot apparatus, together which allow the stage to tilt. The slot apparatuses include a first plate attached to the mounting platform and having a straight slot and a curved slot disposed therein, and a second plate attached to the mounting platform directly opposing and parallel to the first plate and having a straight slot and a curved slot directly opposing the straight slot and curved slot in the first plate. The first pivot is disposed through the straight slots and the second pivot is disposed through the curved slots. An adjustment mechanism is functionally connected to the first pivot to adjust the relative position of the first pivot in the straight slots. This mechanism can be mechanical or motorized. In a particular embodiment of the invention, the adjust mechanism is a Vernier drive. As the relative position of the first pivot with respect to the first and second plate straight slots changes, the tilt head tilts downward from the horizontal. One or more locking devices can be functionally attached to one or both of either the first pivot or second pivot to fix the pivot into a selected position with respect to the slots in which it is disposed. In an exemplary embodiment of the invention, the stage only tilts downward.

The stage has a payload plate clamping mechanism to secure a payload on top of the stage. The payload plate clamping mechanism includes a fixed female boss and a tensioned, rotating female boss opposing the fixed female boss. The rotating boss is positioned and tensioned to remain open until mated with a male boss. A safety mechanism locks the payload plate onto the stage.

A monitor mount can be removably attached to a central post of the stabilizer below a gimbal apparatus. The monitor mount has a first arcuate clamp portion and a second arcuate clamp portion that are hingedly attached to one another. One or more interchangeable inserts are axially sized to fit within the first and second arcuate clamp portions and axially registered to the arcuate clamp portions. The inserts are further sized to fit around a specific size central post and axially registered to it.

The monitor mount further includes a rod system having a pair of parallel rods slidably disposed within tubes, such that the tubes rigidly attached to one another via an expanse to maintain the distance between the rods. Rod clamp levers are provided to secure the parallel rods in the tubes.

The insert has a first flange with a first notch sized to engage in a close fit a tongue in the first arcuate clamp portion. The first flange also has a second notch, larger than the first notch, disposed on a side of the insert opposing the first notch. Thus when the insert is reversed on the stabilizer, the second notch allows a certain degree of rotation even though the parts are axially registered.

The insert can have a live hinge sufficient to open the insert to place it around the central post.

The insert is substantially cylindrical and includes a first partially circumferential flange of varying axially width that is disposed around the insert's top edge. A second partially circumferential flange of varying axially width is positioned part way down along the length of the insert. The longitudinal distance between the first flange and the second flange is sufficient to accommodate the first and second arcuate clamp portions. The insert can extend longitudinally below the first and second arcuate clamp portions to limit the distance between the monitor mount and other stabilizer parts, for example those on a battery system. This is provided as a damage control mechanism.

The payload clamping mechanism can include a safety mechanism to secure a payload more reliably on the mounting platform. A depressible pin is provided and positioned so when the rotating boss is open the pin is depressed, and the pin is extended when the rotating boss is in a payload clamping position. A safety release is functionally attached to the safety pin to depress the safety pin to release the payload. A locking lever can be attached to the rotating boss to clamp the rotating boss in a closed clamping position. The safety mechanism can further include a pivot arm positioned against the rotating boss to affect clamping pressure of the boss. An adjustment component is attached to the pivot arm to adjust the clamping pressure of the rotating boss. The rotating boss can also be slidable with respect to mounting platform.

DESCRIPTION OF THE DRAWINGS

FIGS. 1A-B depict a tilt head in a horizontal position and a tilted position, respectively, according to an illustrative embodiment of the invention.

FIG. 3A is a side view of a tilt head according to an illustrative embodiment of the invention.

FIG. 3B is a cross sectional view of FIG. 3A through line A-A according to an illustrative embodiment of the invention.

FIG. 4 depicts a view from underneath a tilt head according to an illustrative embodiment of the invention.

FIG. 15 depicts an insert for a monitor mount according to a further illustrative embodiment of the invention.

DETAILED DESCRIPTION OF THE INVENTION

The term "camera" as used herein refers broadly to an imaging device. The term "camera stabilizer" refers to devices of the type marketed under the brand "Steadicam®" or other such devices for similar purposes.

Figure 19:
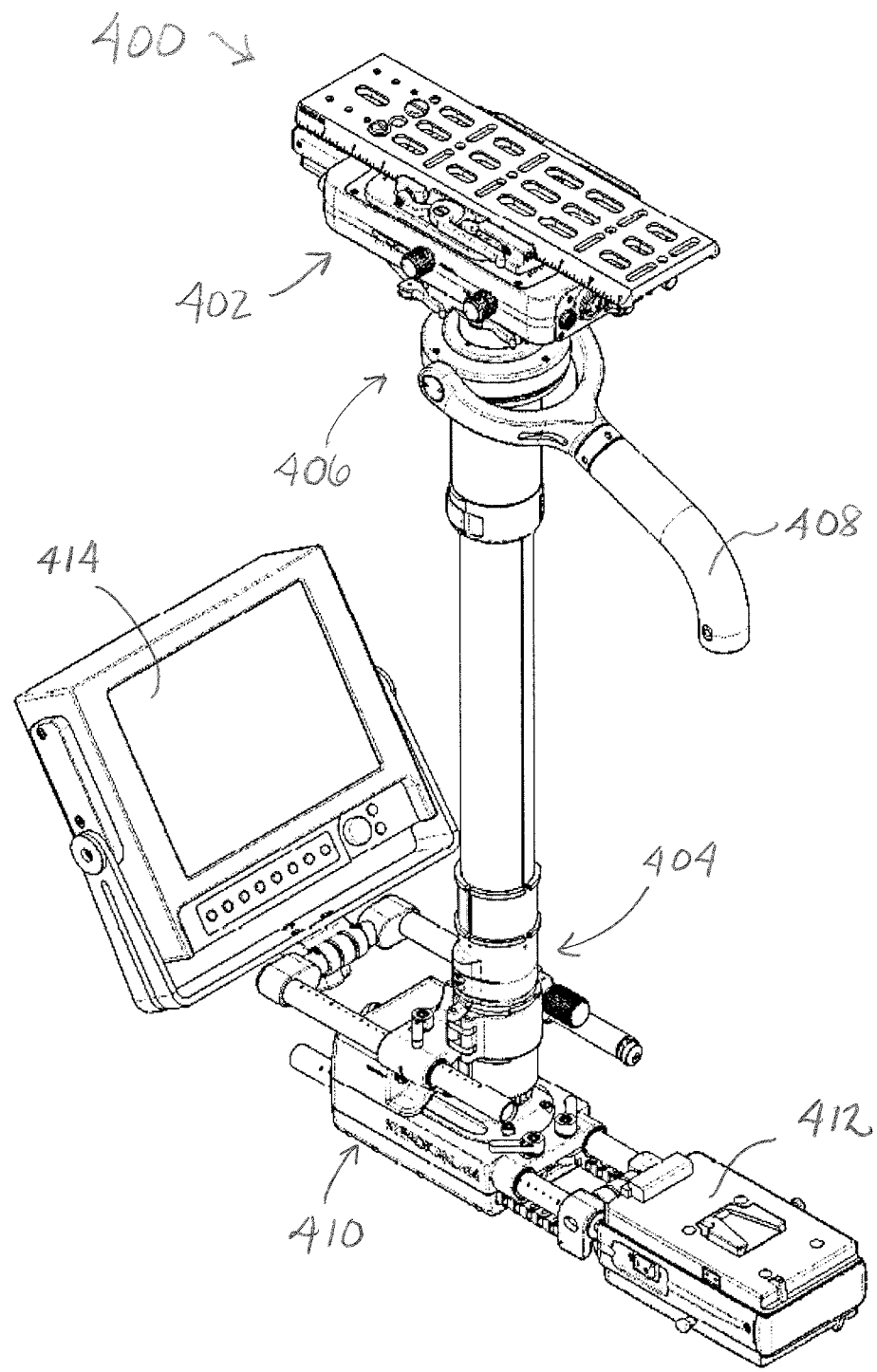
FIG. 19 depicts a camera stabilizer with a tilt head, a monitor mount, a gimbal system and a battery system according to an illustrative embodiment of the invention.

The invention includes a camera stabilizer system such as shown in FIG. 19 and its individual components including a monitor mount, a tilt head, and a clamping mechanism for attaching a camera to a stage.

Figure 1A:
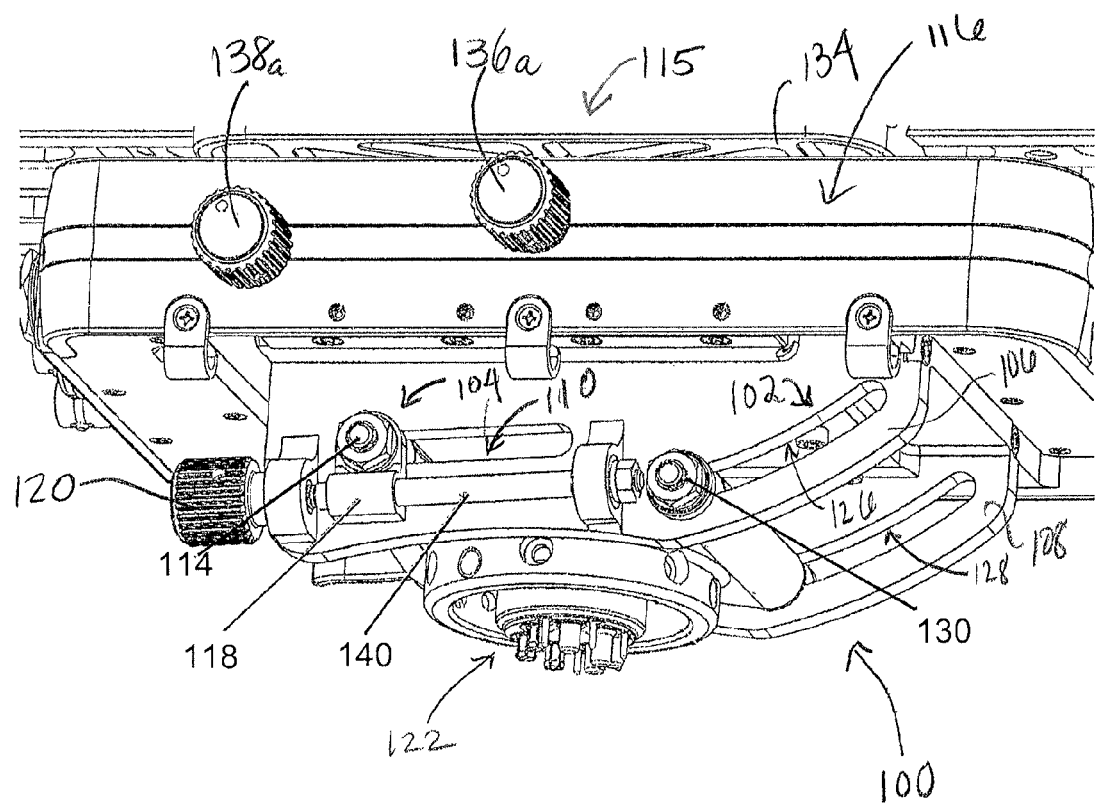
Figure 2:
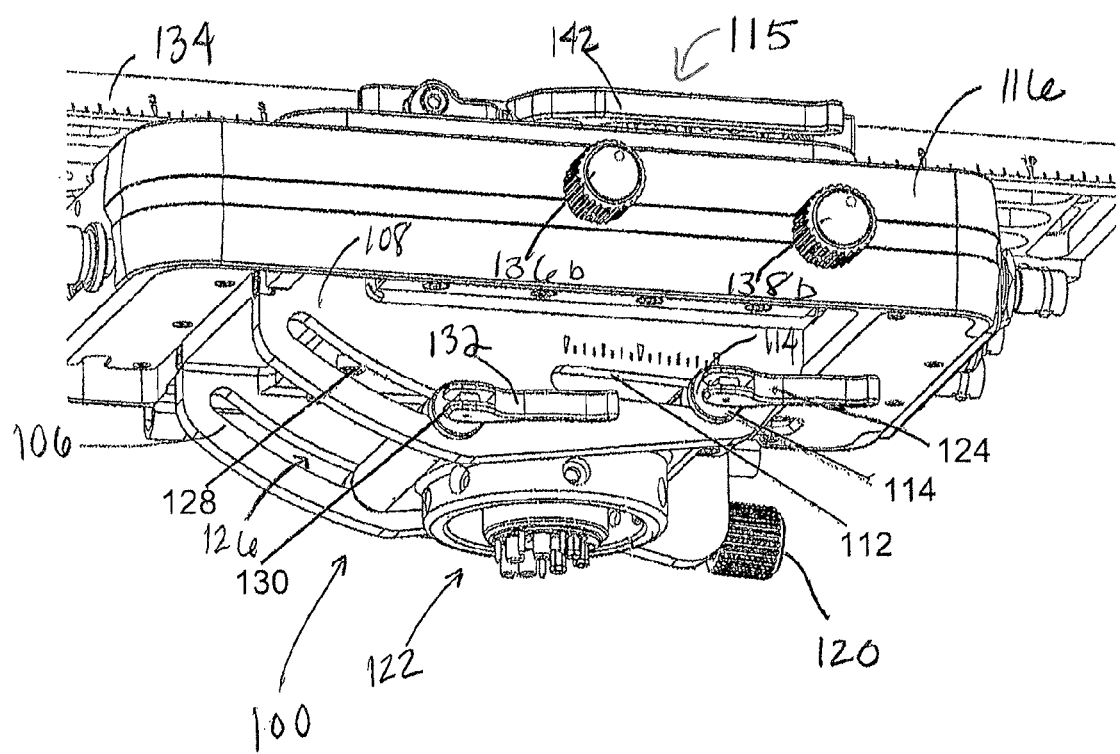
FIG. 2 depicts an opposing view of the tilt head of FIG. 2 FIGS. 1A-1B according to an illustrative embodiment of the invention.

FIGS. 1A-B and 2 depict opposing views of a stage 115 having a tilt head 100 according to an illustrative embodiment of the invention. FIG. 1A depicts tilt head 100 in a substantially horizontal position. FIG. 1B depicts tilt head 100 in a tilted position as can be seen with regard to horizontal reference line 105. Tilt head 100 has a curved slot apparatus 102 and a straight slot apparatus 104 that together effectuate tilting of a camera mounting platform 116 disposed on tilt head 100. Straight slot apparatus 104 permits the addition of a Vernier drive 118 that can both tilt the head with precision and hold it sufficiently well for testing of the appropriate angle for shooting. Vernier drive 118 can be motorized for changing the tilt angle.

Tilt head 100 has a pair of opposing plates 106, 108, each secured to a camera mounting platform 116. Straight slot apparatus 104 includes opposing straight slots 110, 112 disposed in plates 106, 108, respectively. A rear pivot 114 (also referred to herein as a "first pivot") is disposed through straight slots 110, 112, about which camera mounting platform 116 pivots. A locking mechanism, such as straight slot clamp lock 124 seen in FIG. 2, is provided to secure mounting platform 116 at a desired angle.

Figure 5:
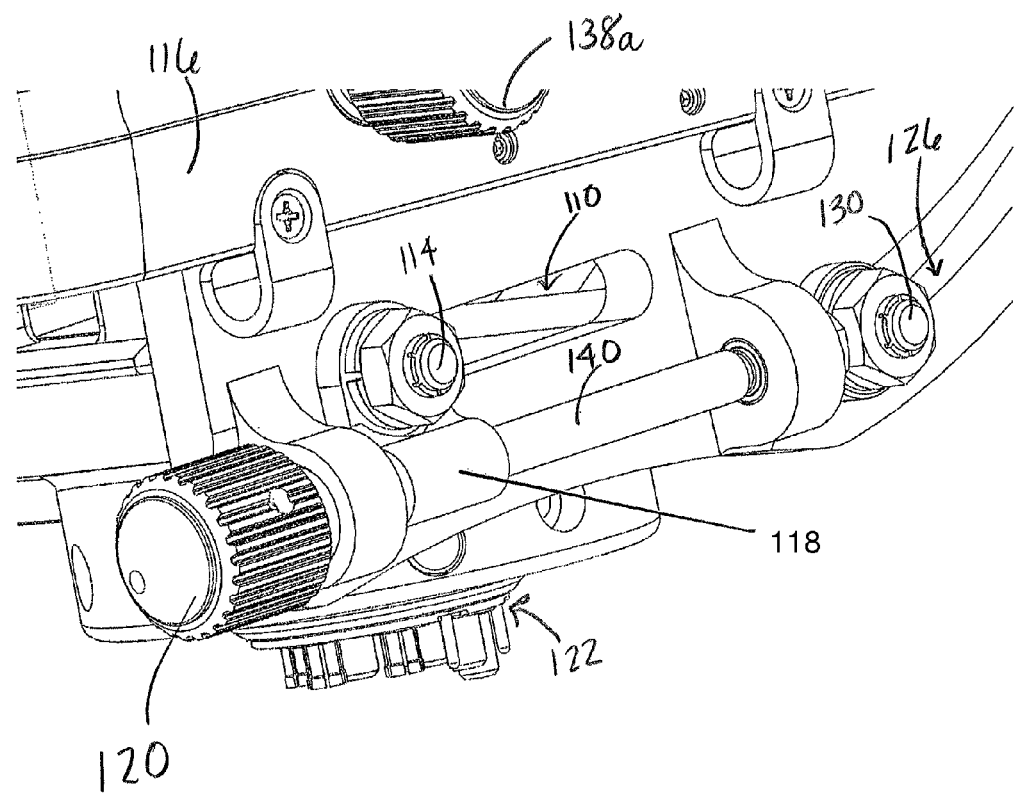
FIG. 5 is an enlargement of the Vernier drive apparatus shown in FIG. 1A.

FIG. 3A depicts a side view of a tilt head apparatus according to an illustrative embodiment of the invention. FIG. 3B depicts a cross section of FIG. 3A through line A-A. The section is through pivot 114 and shows Vernier drive shaft 140 and Vernier knob 120. FIG. 5 is an enlargement of the Vernier drive apparatus shown in FIG. 1A. Vernier drive 118 progresses along a drive shaft 140. It is functionally attached to rear pivot 114 to advance rear pivot 114 with respect to straight slots 110, 112. Vernier knob 120 is provided to achieve the Vernier drive adjustments.

Curved slot apparatus 102 includes opposing curved slots 126, 128 disposed in plates 106, 108, respectively. A forward pivot 130 (also referred to herein as a "second pivot") is disposed through curved slots 126, 128, about which camera mounting platform 116 pivots. A locking mechanism, such as curved slot clamp lock 132 seen in FIG. 2, is provided to secure mounting platform 116 at a desired angle.

As a comparison of the position of pivots 114 and 130 in slots 110 and 126, respectively, in FIGS. 1A and 1B shows, as Vernier drive 118 moves linearly with respect to straight slot 110, curved slots 126, 128 cause mounting platform 116 to pivot about forward pivot 130 since the distance between rear pivot 114 and forward pivot 130 is fixed.

FIG. 4 depicts a view from underneath of tilt head 100. Tilt head 100 is attachable to a central post of a camera stabilizing device via post connector 122. Electrical connections can be included in connector 122 to functionally connect one or more motors to mounting platform 116 or Vernier drive 118. Slots 110, 112, 126, 128 permit tilt adjustments of mounting platform 116 without tilting the central post. In an illustrative embodiment of the invention, mounting platform 116 can be tilted from the horizontal downward only. Illustrative ranges of maximum tilt from the horizontal are about 10° to about 20°, and about 14° to about 16°. In a particular embodiment of the invention the tilt head can tilt downward to approximately 15° from the horizontal. Tilt heads can also be designed to tilt both upward and downward from the horizontal level. An illustrative maximum range of upward and downward tilt is about +15° degrees to about +20° degrees.

The tilt head can be configured to have a relatively low profile and preferably be light weight. The combination of straight slots 110, 112 and curved slots 126, 128 allows the center of gravity of the camera or other payload to remain close to a single appropriate position as the head is tilted so that balance is substantially maintained.

Figure 6:
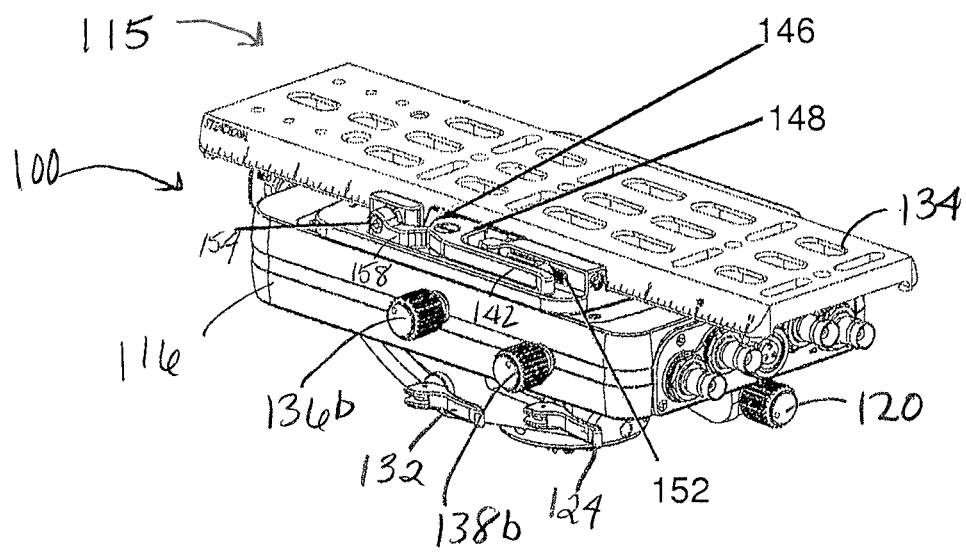
FIG. 6 shows a stage having a payload plate positioned on a mounting platform according to an illustrative embodiment of the invention.
Figure 7:
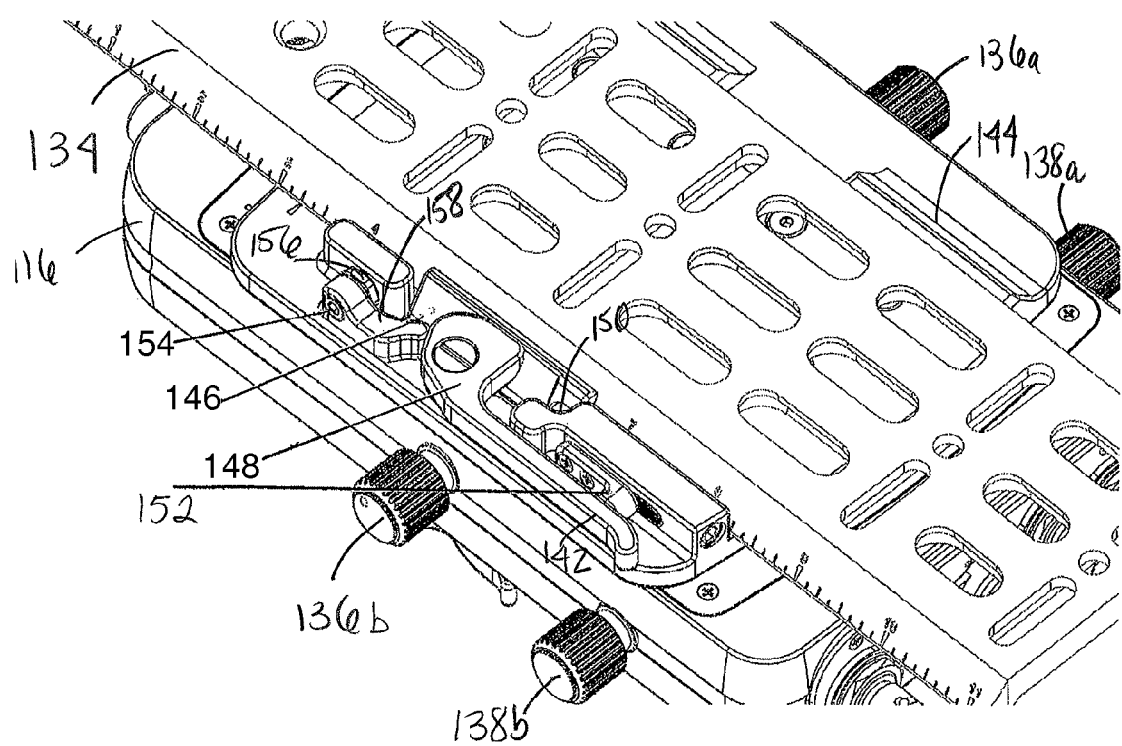
FIG. 7 depicts a clamping mechanism in a closed position and provides an enlargement of a safety mechanism according to an illustrative embodiment of the invention.

FIG. 6 shows a stage 115 having a payload plate 134 positioned on mounting platform 116 according to an illustrative embodiment of the invention. FIG. 7 is an enlargement of a payload plate securing mechanism of FIG. 6. Payload plate 134 is adjustable in the X and Y directions with respect to mounting platform 116. Knobs 136a, 136b, 138a, 138b are provided to adjust mounting stage along the x-axis and y-axis. Payload plate clamp lock 142 can be included to secure payload plate 134 in a desired position.

Figure 8:
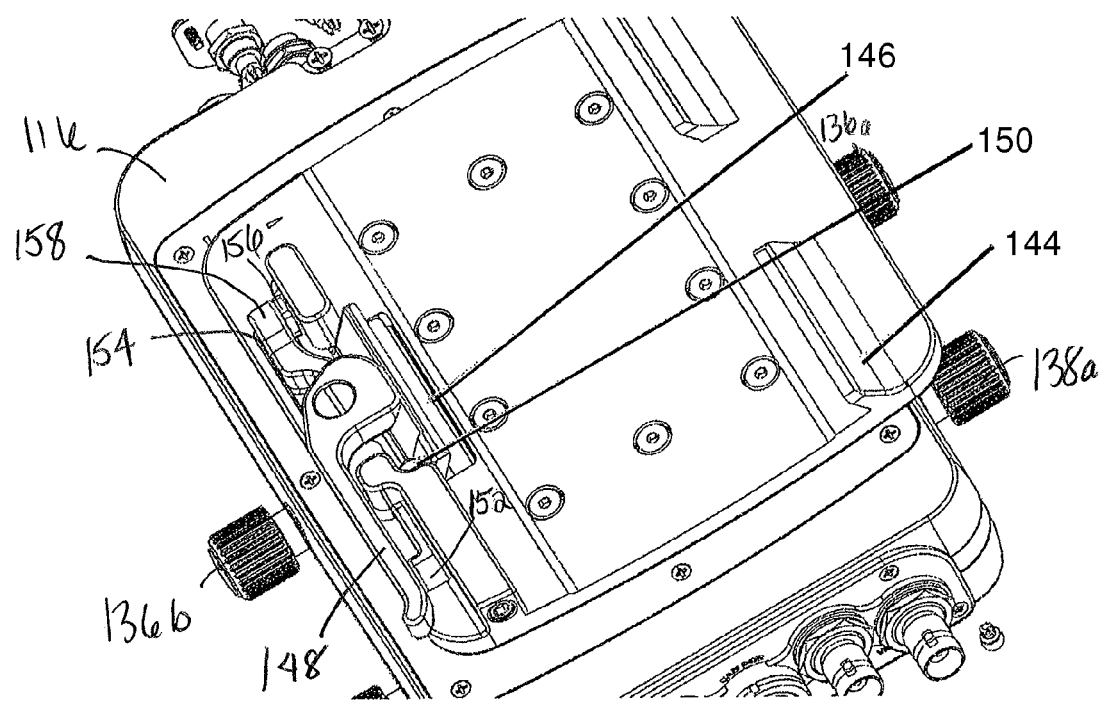
FIG. 8 depicts an enlargement of a dovetail clamping mechanism without a payload plate clamped to the mounting platform according to an illustrative embodiment of the invention.
Figure 9:
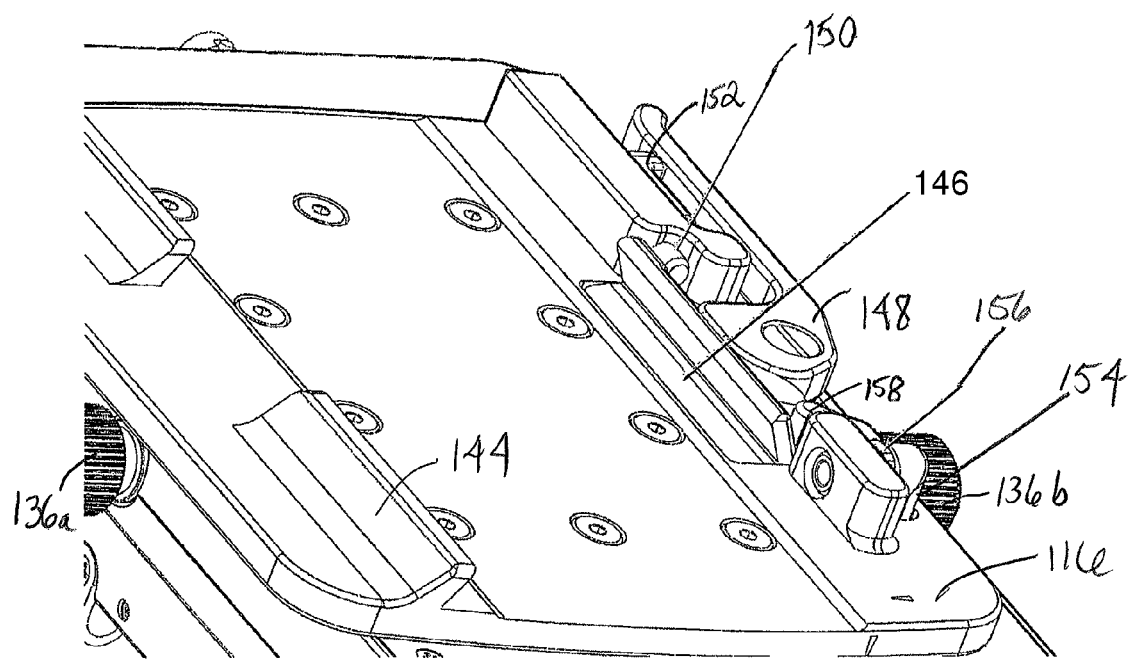
FIG. 9 shows another view of the clamping mechanism of FIG. 8 according to an illustrative embodiment of the invention.

FIGS. 7-9 depict a clamping apparatus to clamp a payload, such as a camera, to a payload plate according to an illustrative embodiment of the invention. FIG. 7 depicts the clamping mechanism in a closed position and provides an enlargement of a safety mechanism according to an illustrative embodiment of the invention. FIG. 8 depicts an enlargement of a dovetail clamping apparatus without payload plate 134 clamped to mounting platform 116 according to an illustrative embodiment of the invention. FIG. 9 shows another view of the clamping apparatus according to an illustrative embodiment of the invention.

As shown in FIG. 7, payload plate 134 can be attached to mounting platform 116 by a fixed female boss 144 on one side, and a tensioned, rotating, and preferably sliding, female boss 146 on the opposite side that pivotably acts to clamp payload plate 134 into the apparatus. Tensioning may be created for example by spring loading the boss. The bosses may be for example, dovetails.

As shown in FIGS. 8 and 9, rotating clamp 146 remains "open" to accept a male dovetail contained on a payload. Placing the camera onto rotating clamp 146 causes clamp 146 to rotate into a locked position. This is accomplished by a safety release mechanism that includes a safety pin 150, functionally attached to a safety release 152. Safety pin 150 remains depressed when rotating clamp 146 is in an 'open' position. When a camera is placed on rotating clamp 146 it rotates and safety pin 150 is freed to extend to a position that blocks rotating clamp 146 from pivoting back to a position that would release the camera. When sliding pressure is applied to safety release 152, safety pin 150 withdraws, thereby releasing rotating sliding clamp to pivot to an 'open' position.

Once rotating clamp 146 is in a 'closed' position, the payload is safe to slide for gross positioning. Closing a payload plate locking lever 148 fixes rotating clamp 146 and also hides safety release 152, so the camera cannot inadvertently be released. Furthermore, a set screw 154 and locking nut 156 at one end of a pivoting arm 158 allows the entire payload plate clamping cam lever 148 to be adjusted for the proper clamping pressure on the dovetail. Employing set screw 154 at the end of pivoting arm 158, rather than centrally or squarely moving payload plate clamping cam lever 148, increases the resolution of the set screw adjustment. The single screw and pivoting mechanism also simplifies the adjustment process by eliminating or reducing the need to keep a multiplicity of adjustment screws precisely adjusted to each other.

Figure 10:
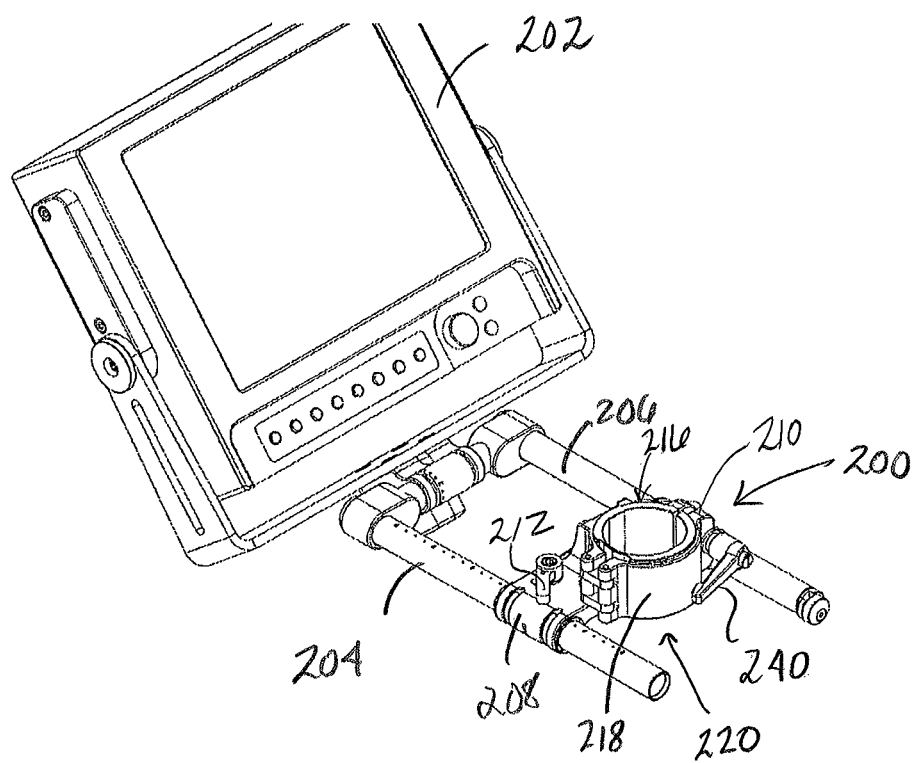
FIG. 10 shows a monitor attached to a monitor mount according to an illustrative embodiment of the invention.
Figure 11:
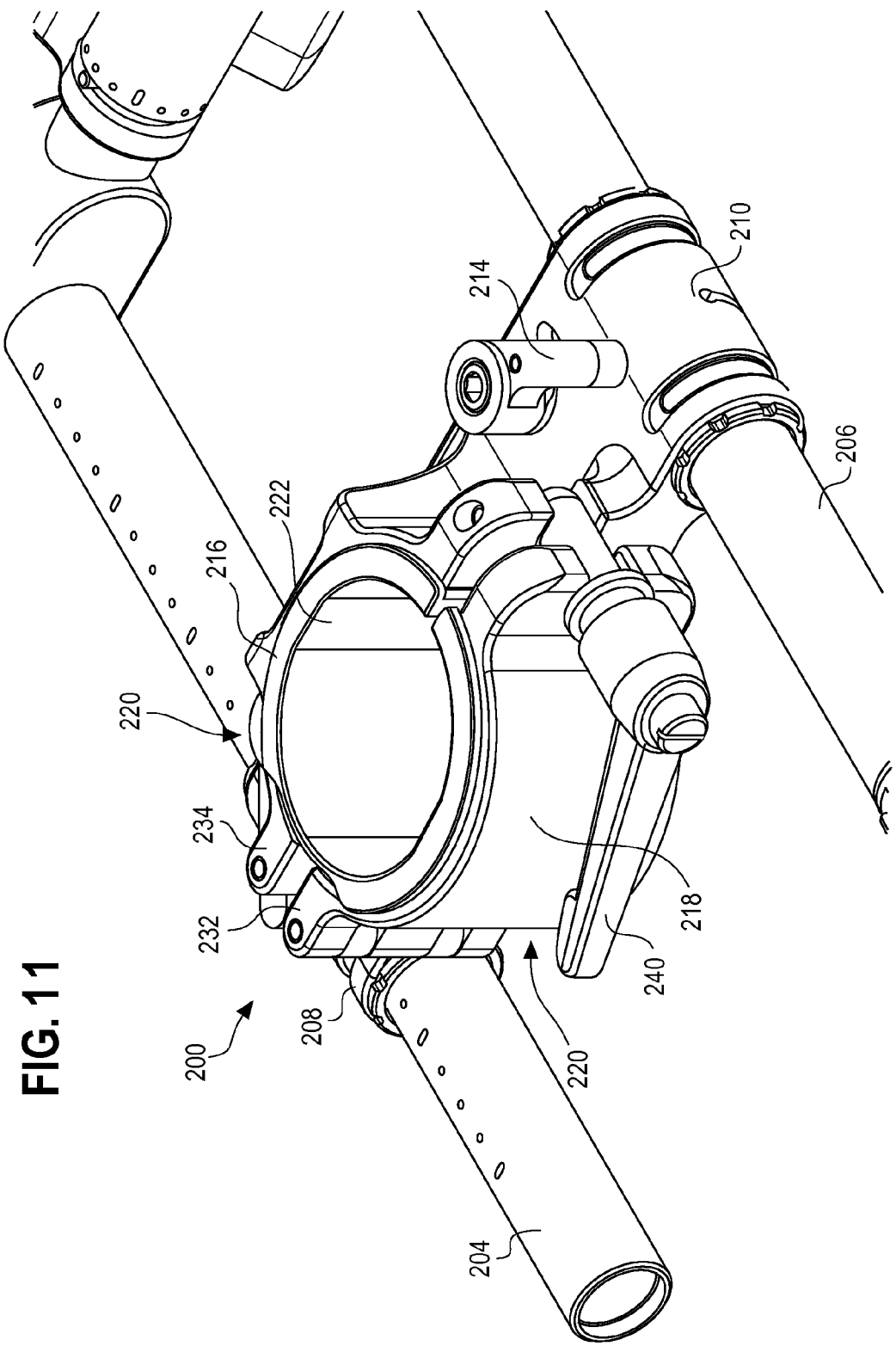
FIG. 11 is an enlarged view of a post clamping system according to an illustrative embodiment of the invention.
Figure 12:
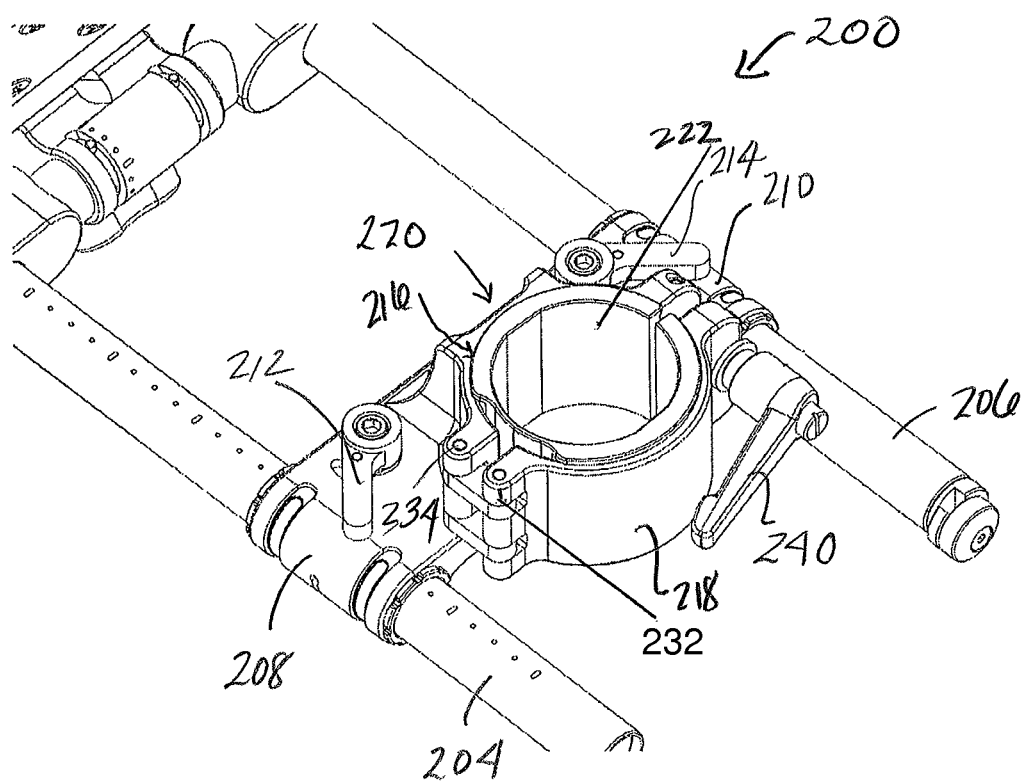
FIG. 12 is another enlarged view of a post clamping system according to an illustrative embodiment of the invention.

FIGS. 10-12 depict a monitor mount 200 according to an illustrative embodiment of the invention for use with an inertial camera stabilization system. Monitor mount 200 has a post clamping system 220 to mount a monitor 202 to a central post of the stabilization system.

FIG. 10 shows monitor 202 attached to monitor mount 200 according to an illustrative embodiment of the invention. Monitor 202 is pivotably attached about a substantially horizontal axis to a rod system that includes a pair of parallel rods 204, 206. Parallel rods 204, 206 are slidably disposed within tubes 208, 210, respectively. Rod clamp levers 212, 214 secure rods 204, 206 in tubes 208, 210, respectively. Tubes 208, 210 are rigidly connected to one another, and may be separate components, or integral with a connecting component as shown in FIGS. 11 and 12.

FIGS. 11 and 12 are enlarged views of post clamping system 220 according to an illustrative embodiment of the invention. Arcuate clamp portions 216, 218 are disposed between rods 204, 206 and attached to tube 208. A specially sized insert 222 is adapted to the size of the stabilization central post. A plurality of inserts can be provided, each sized to a specific diameter post.

Arcuate portions 218, 216 are hinged at hinges 232, 234, respectively, to allow the arcuate segments to be pivoted apart to accommodate inserts of different sizes. An inner surface of insert 222 contacts the central post. An outer surface of insert 222 contacts arcuate clamp portions 216, 218, so that the post clamp system 220, via insert 222, substantially engages the post surface when clamping. Insert 222 is internally axially registered to the post to which it adapts, and externally axially registered to arcuate clamp portions 216, 218, so that monitor mount 200 is axially registered to the central post of the stabilization system structure.

Figure 13:
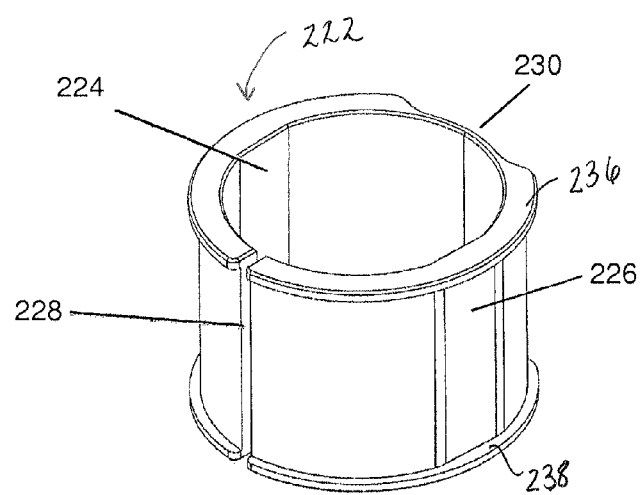
FIG. 13 depicts an insert for a post clamping system according to an illustrative embodiment of the invention.

FIG. 13 depicts an insert 222 according to an illustrative embodiment of the invention. Insert 222 has an exterior flat portion 226 on its external surface that registers with the internal surface of arcuate clamp portions 216, 218. Insert 222 also has an interior flat portion 224 on its interior surface for registration to a post.

Insert 222 also has a slot 228 that allows arcuate clamp portions 216, 218 to compress around a central post. Insert 222 is constructed of a material, such as plastic, that allows it to deform when clamped by arcuate clamp portions 216, 218, thereby reducing or eliminating the width of slot 228. Deformation of insert 222 can be further facilitated by providing a thin section 230 opposing slot 228. Lever 240 clamps arcuate clamp portions 216, 218 to a desired size. In an illustrative embodiment of the invention, insert 222 has an axial wall thickness, in areas other than the flat or thin sections, in the range of about 0.1 cm to about 1.0 cm. Various inserts can have different axial thicknesses to provide different inner diameters to accommodate different central post outer diameters.

Insert 222 can be left on the post or removed as necessary. When arcuate clamp portions 216, 218 are loosened for sliding the monitor mount vertically on a given post, the inserts are captured by arcuate clamp portions 216, 218 and slide with, and remain registered to, them by virtue of flanges 236, 238 on the top and bottom, respectively, of insert 222. The clamping system is preferably tool-free.

Figure 14:
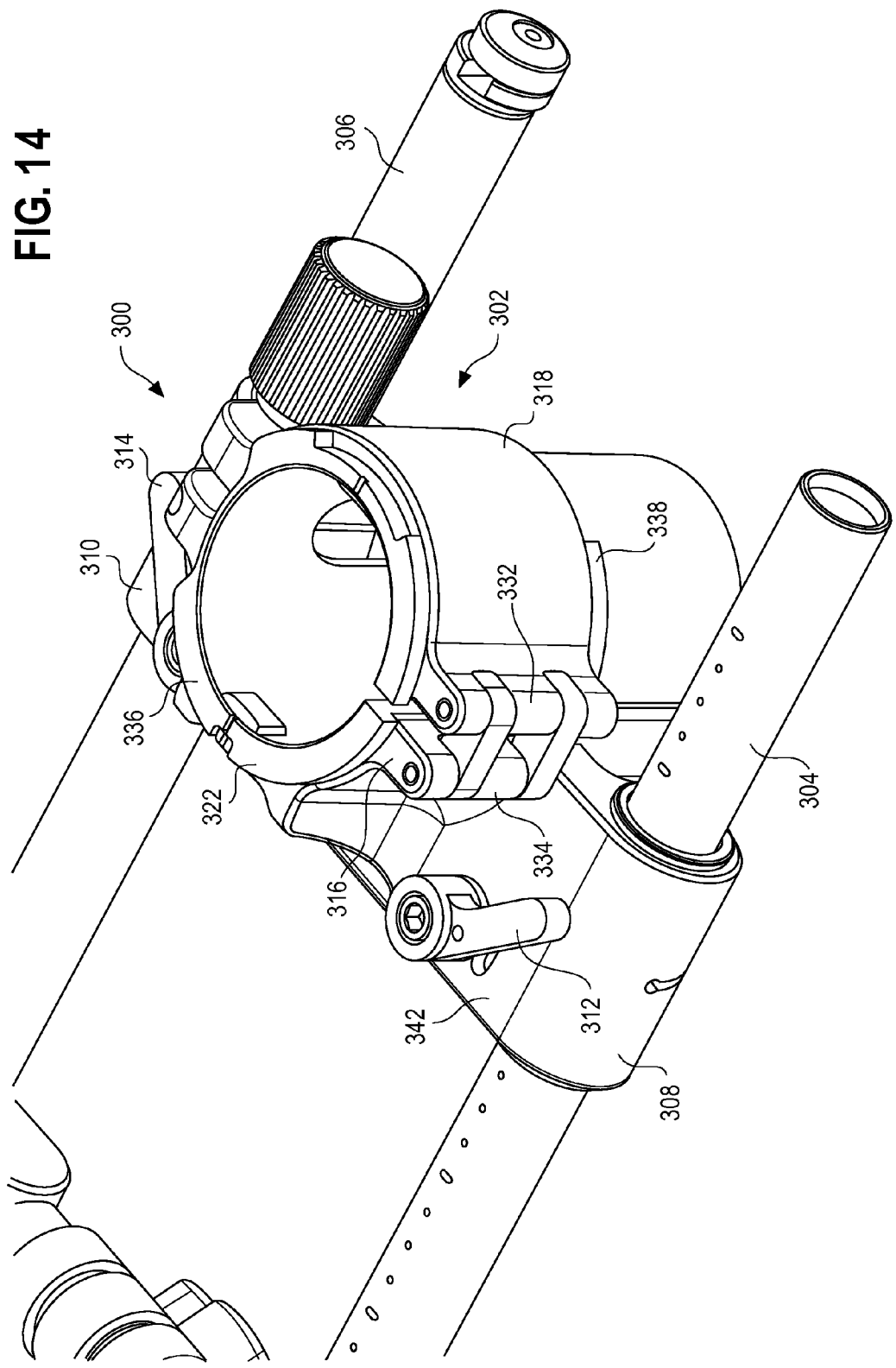
FIG. 14 depicts a monitor mount according to a further illustrative embodiment of the invention.

FIG. 14 depicts a monitor mount 300 according to an illustrative embodiment of the invention. Monitor mount 300 has a post clamping system 302 to mount a monitor to a central post of a stabilization system. A rod system includes a pair of parallel rods 304, 306. Parallel rods 304, 306 are slidably disposed within tubes 308, 310, respectively. In the embodiment depicted in FIG. 14, tubes 308 and 310 are integrally connected via expanse 342. Tubes 308, 310 can also be connected via a separate connecter component that would rigidly maintain the spacing between the rods. Rod clamp levers 312, 314 secure rods 304, 306 in tubes 308, 310, respectively. Arcuate clamp portions 316, 318 are disposed between rods 304, 306 and attached to tube 308. A specially sized insert 322, which is explained in more detail below, is adapted to the size of the stabilization central post. A plurality of inserts can be provided, each sized to a specific diameter post or portion of a post as may be beneficial with a telescoping post.

Arcuate portions 318, 316 are hinged at hinges 332, 334, respectively, to allow the arcuate segments to be pivoted apart to accommodate inserts of different sizes. An inner surface of insert 322 contacts the central post. An outer surface of insert 322 contacts arcuate clamp portions 316, 318, so that the post clamp system 302, via insert 322, substantially engages the post surface when clamping. Insert 322 is internally axially registered to the post to which it adapts, and externally axially registered to arcuate clamp portions 316, 318, so that monitor mount 300 is axially registered to the central post of the stabilization system structure.

FIG. 15 depicts an insert 322 according to an illustrative embodiment of the invention. Insert 322 is substantially cylindrical and has a first partially circumferential flange 336 of varying axially width around the insert's top edge, and a second partially circumferential flange 338 positioned part way down along the length of insert 322. As will be clearer as insert 322 is further described below, flanges 336, 338 may be fully circumferential but will eliminate or change capabilities of the insert.

Figure 18:
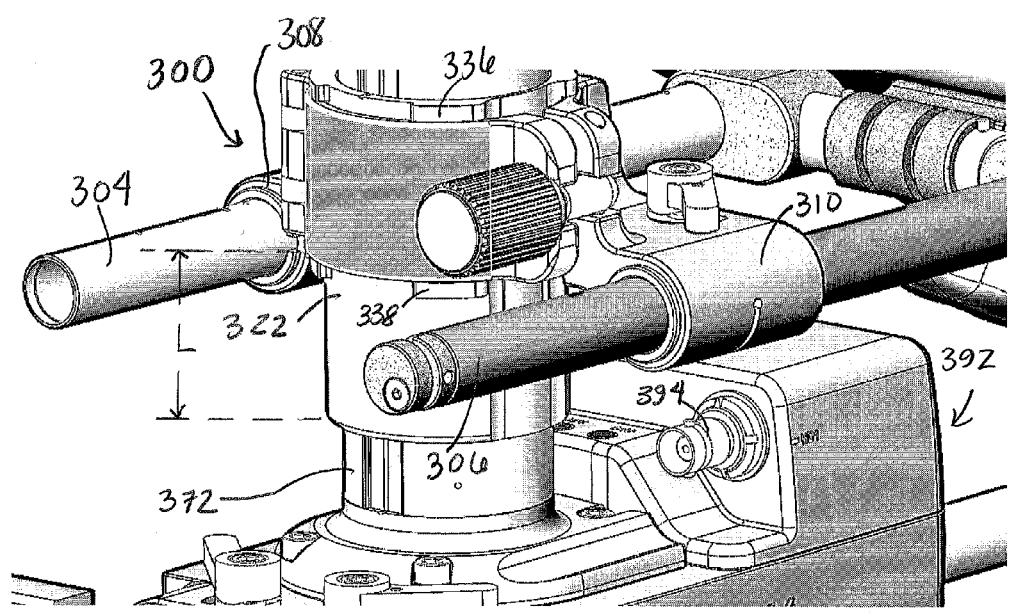
FIG. 18 shows a monitor mount and a battery system mounted to the post of a stabilizer system according to an illustrative embodiment of the invention.

Arcuate clamp portions 316, 318 engage insert 322 between flanges 336, 338 as can be seen in FIG. 14. Insert 322 extends below arcuate clamp portions 316, 318 as a safety mechanism to protect components positioned below monitor mount 300, such as a battery system. FIGS. 16F and 18 show a length L of insert 322 that extends below flange 338 of insert 322, according to an illustrative embodiment of the invention. The minimum length of L will depend on the configuration of monitor mount 300 and any components below it.

FIG. 18 depicts a monitor mount 300 secured to a post 372 with insert 322 disposed above a battery system 392 that is also mounted to post 372. As monitor mount 300 is slid on post 372, insert 322 will eventually abut battery system 392. The length L will be sufficient to prohibit monitor mount 300 from hitting and possibly damaging components of battery system 392, such as Bayonet Neill-Concelman (BNC) connector 394.

Figure 16A:
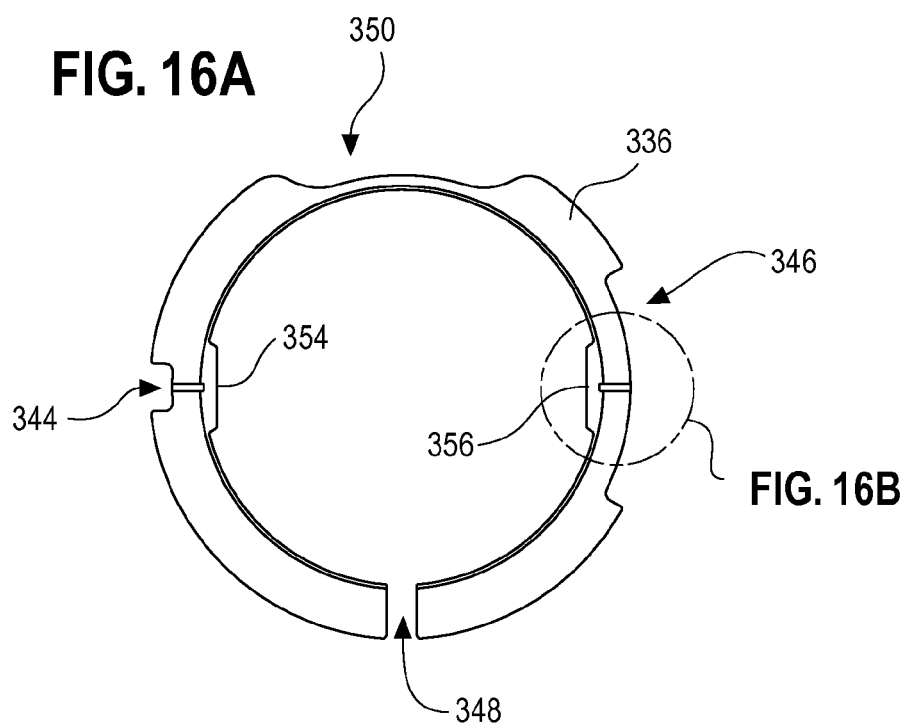
FIGS. 16A-G depict various views of the insert of FIG. 15 according to an illustrative embodiments of the invention.
Figure 16B:
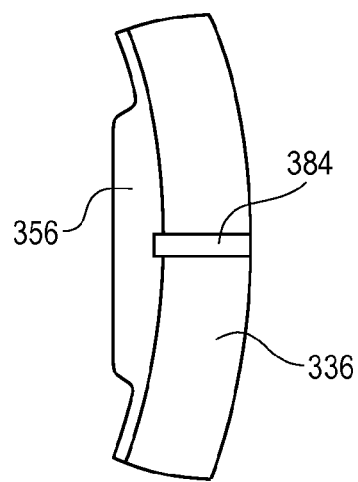
Figure 16C:
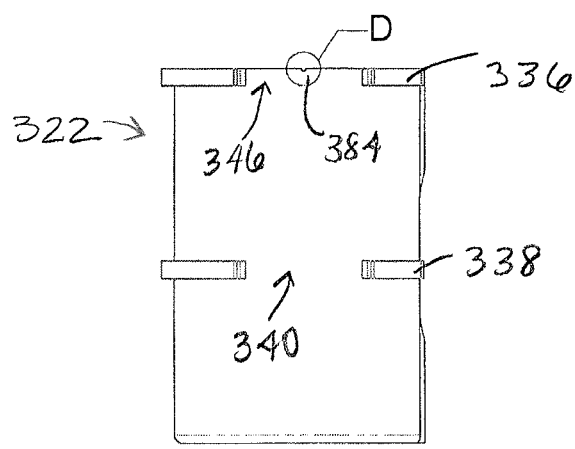
Figure 16D:
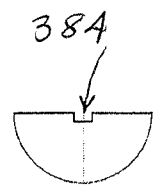
Figure 16E:
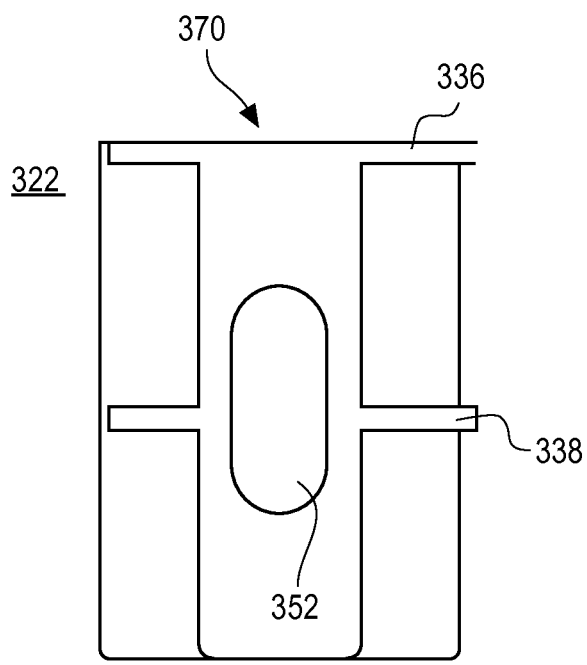
Figure 16F:
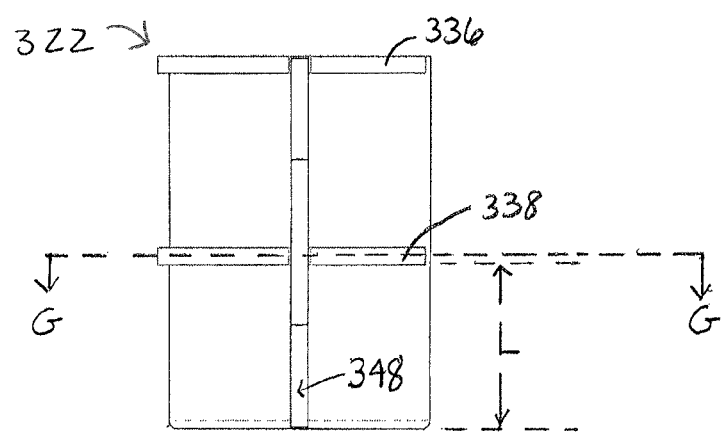

FIGS. 16A-G depict various views of insert 322 according to illustrative embodiments of the invention. FIG. 16A depicts a top view of insert 322, in which the varying width of flange 336 can be seen. A first notch 344 is provided to engage, in a close fit, tongue and groove manner, arcuate clamp portion 316. Other complimentary notch shapes can be used to engage insert 322 to arcuate clamp portion 316, provided they reliably secure the components in position during use. A second notch 346 in flange 336, which is larger than first notch 344, is provided on a side opposing first notch 344.

Figure 16G:
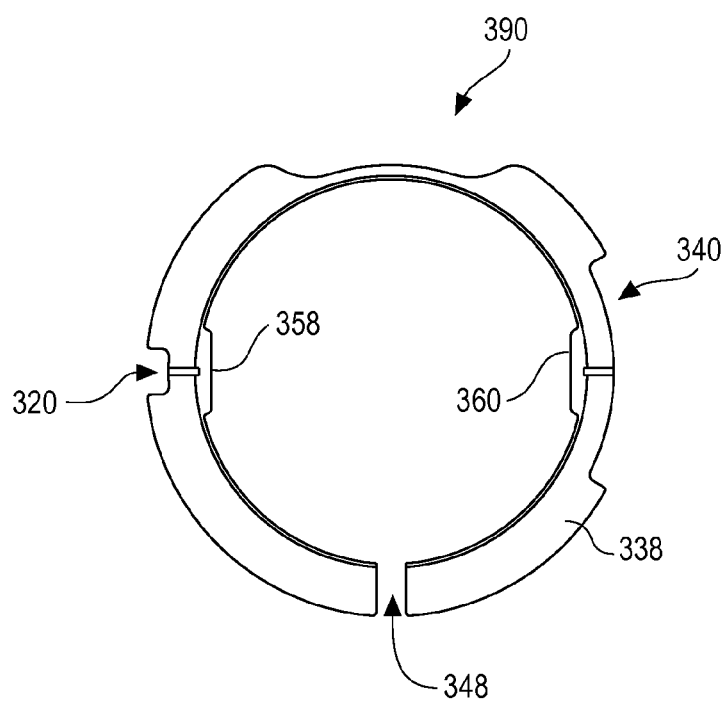

Turning to FIGS. 16C and 16G, notches 320, 340 are shown, which are analogous to notches 344, 346, respectively, and are provided in second flange 338. Insert 322 can be positioned so notch 346 engages a tongue 376 on arcuate clamp portion 316 (see FIG. 17). Because notch 346 is wider than notch 344, there will no longer be a tight tongue and groove interface with tongue 376 of arcuate clamp portion 316. This will allow rotation of insert 322 with respect to arcuate clamp portion 316, and hence a camera stabilizer post that is positioned within and registered to insert 322. An illustrative angular rotation amount is about 45°, i.e. ±22.5°. An illustrative angular rotation range is about 40° to about 50°. It is noted that notches need not exist in both flanges if the complimentary tongue present on the arcuate clamp portion does not extend longitudinally the distance to encompass both flanges, however, securing a tongue in both flanges will generally provide a more secure engagement between the parts.

FIGS. 16A, 16E, 16F and 16G show components of a live hinge 370 that allow insert 322 to be placed around a camera stabilizer post. Insert 322 has a longitudinal opening 348. As seen in FIGS. 16A and 16G, narrowed areas 350, 390 in flanges 336, 338, respectively, facilitate enlarging opening 348 in a hinge-like manner. FIG. 16E shows a slot 352 in a wall of insert 322, located in line longitudinally with narrowed areas 350, 390 of flanges 336, 338, which further facilitates enlarging longitudinal opening 348. The optimum dimensions of slot 352 and narrowed area 350 will depend, at least in part, on the rigidity of the insert material and thickness of the insert walls. Longitudinal opening 348 must be able to open to at least the diameter of the stabilizer post it will surround. Longitudinal opening 348 can be enlarged to a width less than the diameter of the post, and the post can then be pushed into longitudinal opening 348 to further enlarge it until the post slips into the interior of insert 322. Insert 322 could comprise two or more arcuate halves, but a single component with a live hinge simplifies the design.

Insert 322 includes four interior tongues 354, 356, 358, 360 that engage complimentary grooves in a camera stabilizer post. FIG. 16A depicts tongues 354, 356, with an enlargement of tongue 356 provided in FIG. 16B. FIG. 16G provides a cross section G-G through flange 338, showing tongues 358, 360. In an illustrative embodiment of the invention, tongues 354 and 356 oppose one another and tongues 358 and 360 also oppose one another, but are positioned longitudinally below tongues 354, 356. Tongues 358, 360 are positioned so that insert 322 cannot slide further down a stabilizer post than desired. Grooves in the post have an end point that, when encountered by tongues 358, 360, prohibit insert 322 from further movement in that direction with respect to the post.

As provided above, the post is indexed to insert 322 via a tongue and groove mechanism, and arcuate clamp portions 316, 318 are indexed to insert 322, also via a tongue and groove mechanism. It is noted that the positions of the tongue and groove features can be reversed as to the component on which they appear. Other indexing mechanism compatible with the operation of the system can be used. Reference to "tongue and groove" is not limited to a specific shape, but includes all complimentary shapes that can axially register any of the components to one another. Additionally, the number of tongue and groove pairs can vary.

Figure 17:
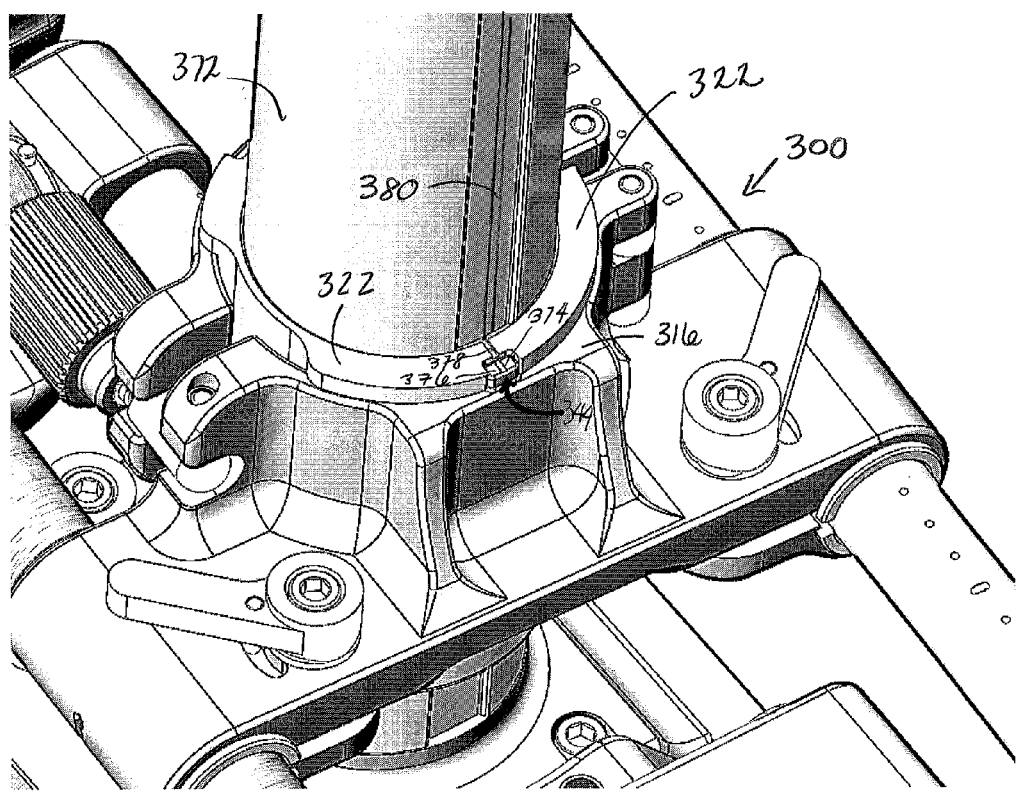
FIG. 17 depicts alignment features to align an insert, arcuate clamp portion and a stabilizer system post according to an illustrative embodiment of the invention.

FIG. 17 depicts alignment features to align insert 322, arcuate clamp portions 316 and post 372 according to an illustrative embodiment of the invention. FIG. 17 shows the arcuate portion 316 side of monitor mount 300. Arcuate portion 316 has an alignment marking 374 in tongue 376. As described above, tongue 376 in arcuate portion 316 can engage notch 344 as shown in FIG. 17, or it can engage notch 346 if insert 322 is employed at a rotational position 180° from the position shown in FIG. 17. Insert 322 has an alignment marking 378 that can be aligned with post alignment marking 380, and arcuate clamp portion alignment marking 374. Another alignment marking 384 can be provided at about the center point of notch 346 in flange 336 as shown in FIG. 16C and the enlargement details shown in FIGS. 16B and 16D. Although notch 346 allows for rotation of insert 322 with respect to arcuate clamp portion 316, it can be helpful to have the center point of notch 346 known as a reference.

FIG. 19 depicts a camera stabilizer 400 with a stage having a tilt head 402, and monitor mount 404, according to an illustrative embodiment of the invention. Tilt head 402 and monitor mount 404 may be of any embodiment described here. Conventional parts may also be mixed and matched with the components described herein. Tilt head 402 may have a payload plate clamping device, also of any embodiment described herein. Stabilizer 400 has a gimbal apparatus 406 that can optionally be attached with a quick release clamp, and a handle 408, which may optionally be removable and interchangeable. Stabilizer 400 also has a battery system 410. Stabilizer 400 is preferably of rigid high modulus carbon fiber construction. Power ports, video ports and high definition ports can be provided in the tilt head, monitor mount and battery system as appropriate. The invention may include all or a combination of some of these components, and may also include a battery 412, monitor 414 or camera.

The invention further includes a kit containing a post clamping system and a plurality of inserts of different diameters. The invention still further includes methods of utilizing any of the devices described herein to utilize a stabilization system or stabilize a payload on a stabilization system.

Various embodiments of the invention have been described, each having a different combination of elements. The invention is not limited to the specific embodiments disclosed, and may include different combinations of the elements disclosed or omission of some elements and the equivalents of such structures.

The invention claimed is:

1. A camera stabilizer system comprising:
    a stage having a payload plate disposed on and attached to a mounting platform;
    a tilt head attached below the mounting platform;
    the tilt head having:
    a first pivot disposed in a straight slot apparatus for movement of the mounting platform in a straight path;
    a second pivot disposed in a curved slot apparatus, the second pivot fixed in distance to the first pivot for movement of the mounting platform in a curved path;
    wherein the fixed pivot distance causes the mounting platform to tilt as it is displaced along the straight path;
    a central post connected to the tilt head by a central post connector;
    the stage having a payload plate clamping mechanism to secure a payload on top of the stage;
    the payload plate clamping mechanism having:
    a fixed female boss;
    a tensioned, rotating female boss opposing the fixed female boss;
    wherein the rotating boss is positioned and tensioned to remain open until mated with a male boss;
    a safety mechanism engageable to lock the payload plate onto the stage;
    a gimbal apparatus connected to the central post beneath the tilt head;
    a monitor mount removably attached to the central post below the gimbal apparatus;
    the monitor mount having:
    a first arcuate clamp portion and a second arcuate clamp portion hingedly attached to one another;
    an insert axially sized to fit within the first and second arcuate clamp portions and axially registered to the first arcuate clamp portion; and
    the insert sized to fit around the central post and axially registered it.

2. The camera stabilizer system of claim 1 wherein the straight slot apparatus and the curved slot apparatus comprise:
    a first plate attached to the mounting platform and having a straight slot and a curved slot disposed therein;
    a second plate attached to the mounting platform directly opposing and parallel to the first plate and having a straight slot and a curved slot directly opposing the straight slot and curved slot in the first plate;
    the first pivot disposed through the straight slots;
    the second pivot disposed through the curved slots;
    an adjustment drive mechanism functionally connected to the first pivot to adjust the relative position of the first pivot in the straight slots;
    the straight slots and the curved slots arranged so that as the relative position of the first pivot with respect to the first and second plate straight slots changes the tilt head tilts downward from the horizontal;
    at least one locking device functionally attached to one of either the first pivot or second pivot to fix the pivot into a selected position with respect to the straight slots or curved slots in which it is disposed.

3. The camera stabilizer system of claim 1 wherein the safety mechanism of the payload clamping mechanism comprises:
    a depressible pin;
    the rotating boss positioned so the pin is depressed when the rotating boss is in an open position and extended when the rotating boss is in a payload clamping position;
    a safety release functionally attached to the safety pin to depress the safety pin to release the payload; and
    a locking lever functionally attached to the rotating boss to clamp the rotating boss in a closed clamping position.

4. The camera stabilizer system of claim 1 wherein the safety mechanism of the payload clamping mechanism further comprises:
    a pivot arm positioned against the rotating boss to affect clamping pressure of the boss; and
    an adjustment component functionally attached to the pivot arm to adjust the clamping pressure of the rotating boss.

5. The camera stabilizer system of claim 1 wherein the tensioned, rotating boss is slidable with respect to mounting platform.

6. The camera stabilizer system of claim 1 wherein the tilt head can only tilt downward from the horizontal.

7. The camera stabilizer system of claim 6 wherein the tilt head can tilt downward from the horizontal a maximum in the range of about 10° to about 20°.

8. The camera stabilizer system of claim 1 wherein the monitor mount comprises:
- a rod system having a pair of parallel rods slidably disposed within tubes, the tubes rigidly attached to one another via an expanse to maintain the distance between the rods;
- rod clamp levers configured to secure the parallel rods in the tubes;
- wherein the a first arcuate clamp portion and a second arcuate clamp portion are disposed between the tubes and attached thereto;
- a first flange having a first notch sized to engage in a close fit, a tongue in the first arcuate clamp portion;
- the first flange further having a second notch, larger than the first notch, disposed on a side of the insert opposing the first notch;
- the insert having a live hinge sufficient to open the insert to surroundingly engage the central post.

9. The camera stabilizer system of claim 8 wherein the live hinge comprises:
- an axially narrowed portion in the first flange and a second flange;
- a longitudinal slot in the insert in line with the narrowed flange portions; and
- a plurality of tongue components engageable with a plurality of complimentary grooves in the central post.

10. The camera stabilizer system of claim 1 wherein the insert is substantially cylindrical and comprises:
- a first partially circumferential flange of varying axially width disposed around the insert's top edge;
- a second partially circumferential flange of varying axially width positioned part way down along the length of the insert;
- the longitudinal distance between the first flange and the second flange sufficient to accommodate the first and second arcuate clamp portions therebetween; and
- the insert having a longitudinal length extending below the first and second arcuate clamp portions.

11. A payload stage comprising:
- a mounting platform;
- a tilt head attached below the mounting platform;
- the tilt head having:
- a first plate attached to the mounting platform and having a straight slot and a curved slot disposed therein;
- a second plate attached to the mounting platform directly opposing and parallel to the first plate and having a straight slot and a curved slot directly opposing the straight slot and curved slot in the first plate;
- a first pivot disposed through the straight slots;
- a second pivot disposed through the curved slots;
- an adjustment mechanism functionally connected to the first pivot to adjust the relative position of the first pivot in the straight slots;
- the slots arranged so that as the relative position of the first pivot with respect to the first and second plate straight slots changes the tilt head tilts downward from the horizontal; and
- at least one locking device functionally attached to one of either the first pivot or second pivot to fix the pivot into a selected position with respect to the slots in which it is disposed.

12. The payload stage of claim 11 wherein the tilt head can only tilt downward from the horizontal.

13. The payload stage of claim 12 wherein the tilt head can tilt downward from the horizontal a maximum in the range of about 10° to about 20°.

14. The payload stage of claim 11 further comprising a payload clamping mechanism comprising:
- a fixed female boss;
- a tensioned, rotating female boss opposing the fixed female boss;
- wherein the rotating boss is positioned and tensioned to remain open until mated with a male boss;
- a safety mechanism engageable to lock the payload plate onto the stage;
- a depressible pin;
- the rotating boss positioned so the pin is depressed when the rotating boss is in an open position and extended when the rotating boss is in a payload clamping position;
- a safety release functionally attached to the safety pin to depress the safety pin to release the payload; and
- a locking lever functionally attached to the rotating boss to clamp the rotating boss in a closed clamping position.

15. The payload stage of claim 14 wherein the safety mechanism of the payload clamping mechanism further comprises:
- a pivot arm positioned against the rotating boss to affect clamping pressure of the boss; and
- an adjustment component functionally attached to the pivot arm to adjust the clamping pressure of the rotating boss.

16. The payload stage of claim 14 wherein the tensioned, rotating boss is slidable with respect to mounting platform.

17. A payload stabilizer comprising a tilt head according to claim 11.

18. A monitor mount comprising:
- a first arcuate clamp portion and a second arcuate clamp portion hingedly attached to one another;
- an interchangeable, substantially cylindrical insert axially sized to fit within the first and second arcuate clamp portions and axially registered to the first arcuate clamp portion;
- the insert sized to fit around a central post of a payload stabilizer and configured to be axially registered to it;
- a rod system having a pair of parallel rods slidably disposed within tubes, the tubes rigidly attached to one another via an expanse to maintain the distance between the rods;
- rod clamp levers configured to secure the parallel rods in the tubes;
- wherein the a first arcuate clamp portion and a second arcuate clamp portion are disposed between the tubes and attached thereto;
- the first flange having a first notch sized to engage in a close fit, a tongue in the first arcuate clamp portion;
- the first flange further having a second notch, larger than the first notch, disposed on a side of the insert opposing the first notch; and
- the insert having a live hinge sufficient to open the insert to surroundingly engage the central post.

19. The monitor mount of claim 18 further comprising:
- the first flange of varying axially width disposed around the insert's top edge;
- a second partially circumferential flange of varying axially width positioned part way down along the length of the insert;

the longitudinal distance between the first flange and the second flange sufficient to accommodate the first and second arcuate clamp portions therebetween; and the insert having a longitudinal length extending below the first and second arcuate clamp portions.

20. The monitor mount of claim 18 wherein the live hinge comprises:
an axially narrowed portion in the first flange and the second flange;
a longitudinal slot in the insert in line with the axially narrowed portion of the first flange and the second flange; and
a plurality of tongue components engageable with a plurality of complimentary grooves in the central post.

21. A payload stabilizer comprising a monitor mount according to claim 18.

22. A payload clamping mechanism comprising:
a fixed female boss;
a tensioned, rotating female boss opposing the fixed female boss;
wherein the rotating boss is positioned and tensioned to remain open until mated with a male boss;
a safety mechanism engageable to lock a payload plate onto a stage;
a depressible safety pin;
the rotating boss positioned so the pin is depressed when the rotating boss is in an open position and extended when the rotating boss is in a payload clamping position;
a safety release functionally attached to the safety pin to depress the safety pin to release the payload; and
a locking lever functionally attached to the rotating boss to clamp the rotating boss in a closed clamping position.

23. A payload stabilizer comprising a payload clamping mechanism according to claim 22.

24. A camera stabilizer system comprising:
a stage having a payload plate disposed on and attached to a mounting platform;
a tilt head attached below the mounting platform;
the tilt head having:
a first pivot disposed in a straight slot apparatus for movement of the mounting platform in a straight path;
a second pivot disposed in a curved slot apparatus, the second pivot fixed in distance to the first pivot by a fixed pivot distance for movement of the mounting platform in a curved path;
wherein the fixed pivot distance causes the mounting platform to tilt as it is displaced along the straight path;
a central post connected to the tilt head by a central post connector;
the stage having a payload plate clamping mechanism to secure a payload on top of the stage;
the payload plate clamping mechanism having:
a fixed female boss;
a tensioned, rotating female boss opposing the fixed female boss;
wherein the rotating boss is positioned and tensioned to remain open until mated with a male boss;
a safety mechanism engageable to lock the payload plate onto the stage;
a gimbal apparatus connected to the central post beneath the tilt head; and
a battery mount system.

* * * * *